March 17, 1959     E. P. REPKE ET AL     2,877,916
LOAD HANDLING DEVICE FOR INDUSTRIAL TRUCKS
Filed Oct. 18, 1956     5 Sheets-Sheet 1

INVENTORS.
EDWARD P. REPKE
DELANO WIGHT
BY
ATTY.

March 17, 1959 E. P. REPKE ET AL 2,877,916
LOAD HANDLING DEVICE FOR INDUSTRIAL TRUCKS
Filed Oct. 18, 1956 5 Sheets-Sheet 3

INVENTORS.
EDWARD P. REPKE
DELANO WIGHT
BY
*J. Frederick Bechtel*
ATTY.

March 17, 1959     E. P. REPKE ET AL     2,877,916
LOAD HANDLING DEVICE FOR INDUSTRIAL TRUCKS
Filed Oct. 18, 1956     5 Sheets-Sheet 4
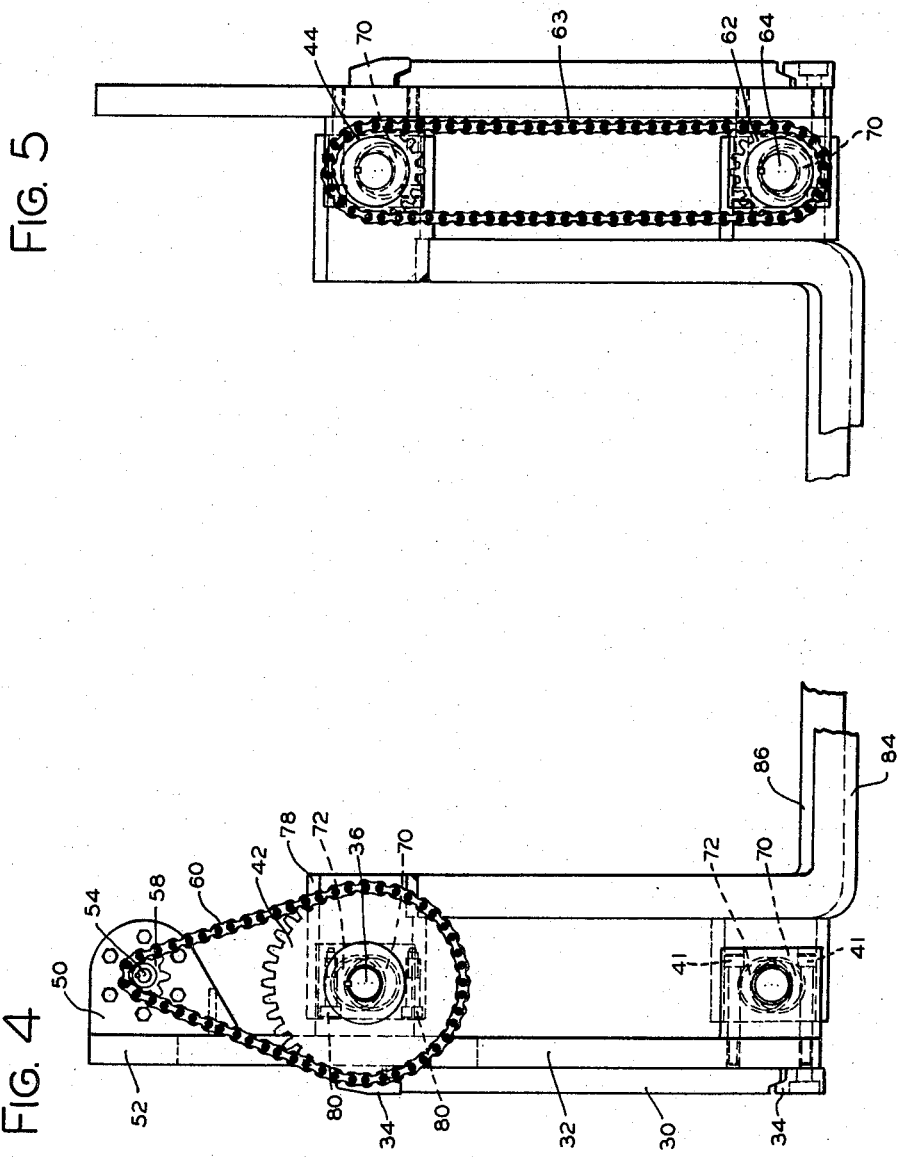
INVENTORS.
EDWARD P. REPKE
DELANO WIGHT
BY
ATTY.

March 17, 1959   E. P. REPKE ET AL   2,877,916
LOAD HANDLING DEVICE FOR INDUSTRIAL TRUCKS
Filed Oct. 18, 1956   5 Sheets-Sheet 5
FIG. 7
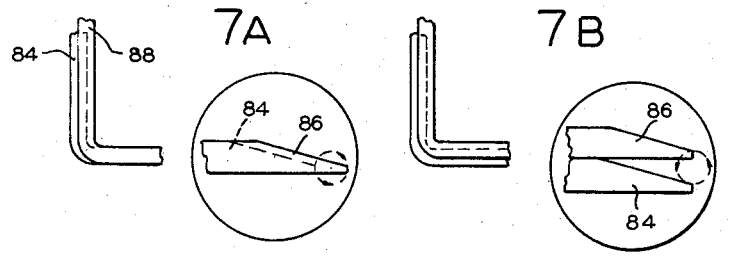
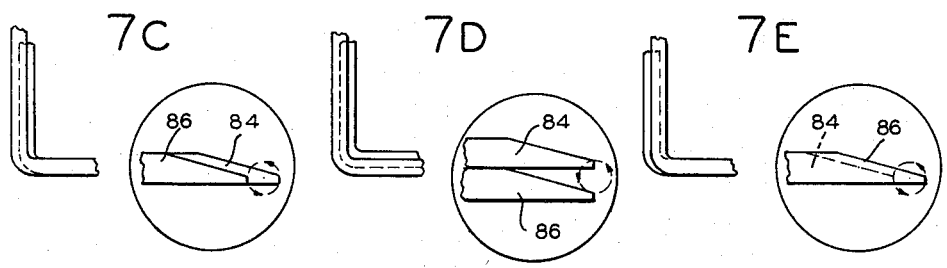
FIG. 8
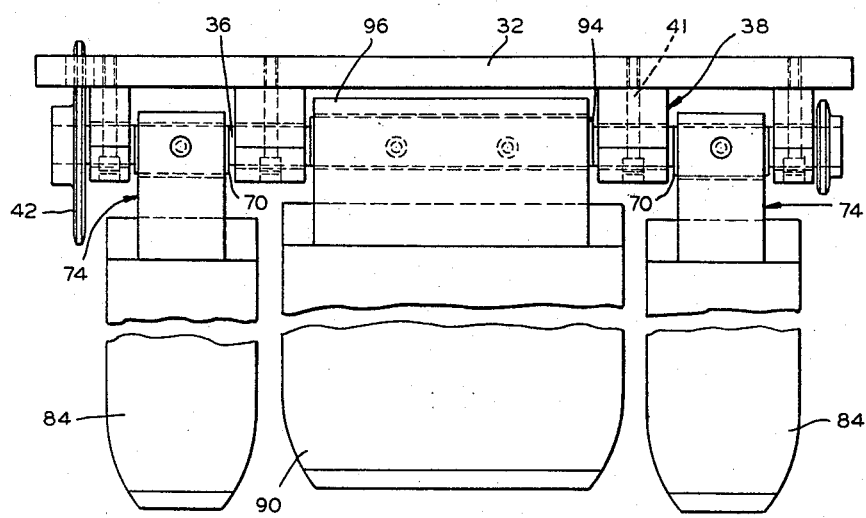
INVENTORS.
EDWARD P. REPKE
DELANO WIGHT
BY
ATTY.

United States Patent Office 2,877,916
Patented Mar. 17, 1959

2,877,916

LOAD HANDLING DEVICE FOR INDUSTRIAL TRUCKS

Edward P. Repke, Coloma, and Delano Wight, Battle Creek, Mich., assignors to Clark Equipment Company, a corporation of Michigan Application October 18, 1956, Serial No. 616,778

9 Claims. (Cl. 214—750)

This invention relates to industrial trucks and more particularly to a load handling attachment therefor.

It has long been a problem in the materials handling industry to devise a relatively simple and inexpensive attachment for an industrial truck which is capable of loading and unloading a variety of types of loads without requiring that any one of such types of loads be palletized. Such capability of an industrial truck attachment would substantially enhance the usefulness of the truck and decrease the indirect costs of operation thereof. For example, available storage space could be utilized more completely in warehousing operations if wooden pallets could be eliminated as a necessary element for the application of industrial trucks to many materials handling problems. Also, the costs of purchasing, storing and maintaining the pallets themselves could be eliminated by use of such an attachment.

Heretofore, numerous attempts have been made to devise a relatively simple, inexpensive, efficient and versatile attachment of the above described type, but none have, to our knowledge, been successful.

It is therefore a primary object of our invention to provide an attachment for use with industrial trucks which is capable of loading, transporting and unloading a wide variety of non-palletized objects.

It is a further object of our invention to provide a load handling device which utilizes at least one pair of load handling members, each one of the members of such pair being actuatable in a closed curvilinear path in out-of-phase relation to the other member of such pair.

It is another object of our invention to provide means for actuating each member of a pair of fork tines or platens in such out-of-phase relation to the other member of such pair that a load may be continuously "walked on" or "walked off" such pair of fork tines or platens.

An additional object of our invention is to provide in an attachment for industrial trucks a plurality of pairs of load handling fork tines or platens which are reciprocable in predetermined curvilinear paths, and a preselected pair of which is actuatable in predetermined out-of-step relation to a second pair such that a substantially continuous "walking on" or "walking off" motion may be imparted to non-palletized articles.

Another object of our invention is to provide a relatively simple, inexpensive, and versatile load handling means for loading and unloading non-palletized articles.

The foregoing and other objects and advantages will become apparent in view of the following description taken in conjunction with the drawings, in which are shown two illustrative embodiments of our invention, and wherein:

Figure 4 is a left-side view of the construction shown in Figure 3;

Figure 5 is a right-side view of the construction shown in Figure 3;

Figure 6 is a plan view of the upper cam shaft shown in Figure 2 with sprockets connected to opposing ends thereof;

Figure 7 is a series of schematic illustrations showing, in Figures 7A, 7B, 7C, 7D and 7E, different operating positions of one pair of fork tines when operated in accordance with our invention; and Figure 8 is a plan view of a modified construction of the attachment as shown in Figure 2.

Figure 1:
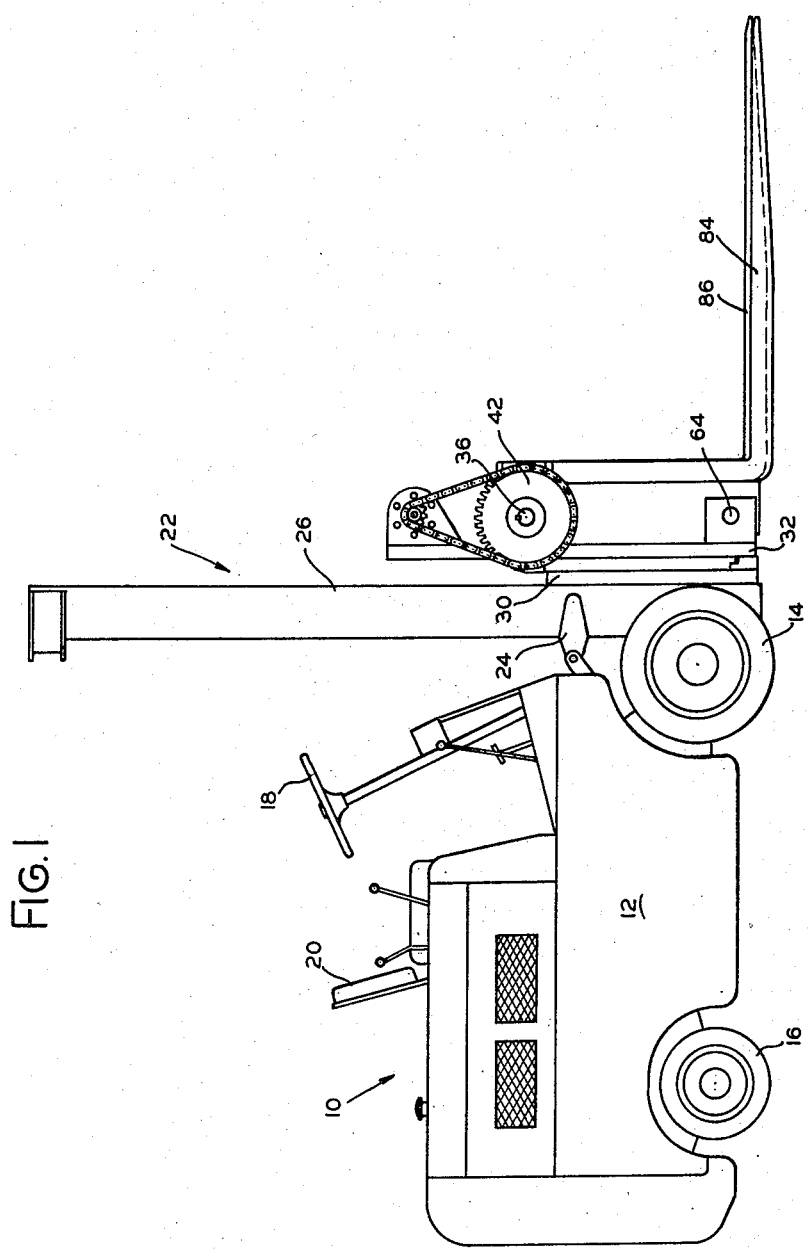
Figure 1 is a side elevational view showing the attachment of our invention connected to the load carriage of an industrial lift truck.
Figure 2:
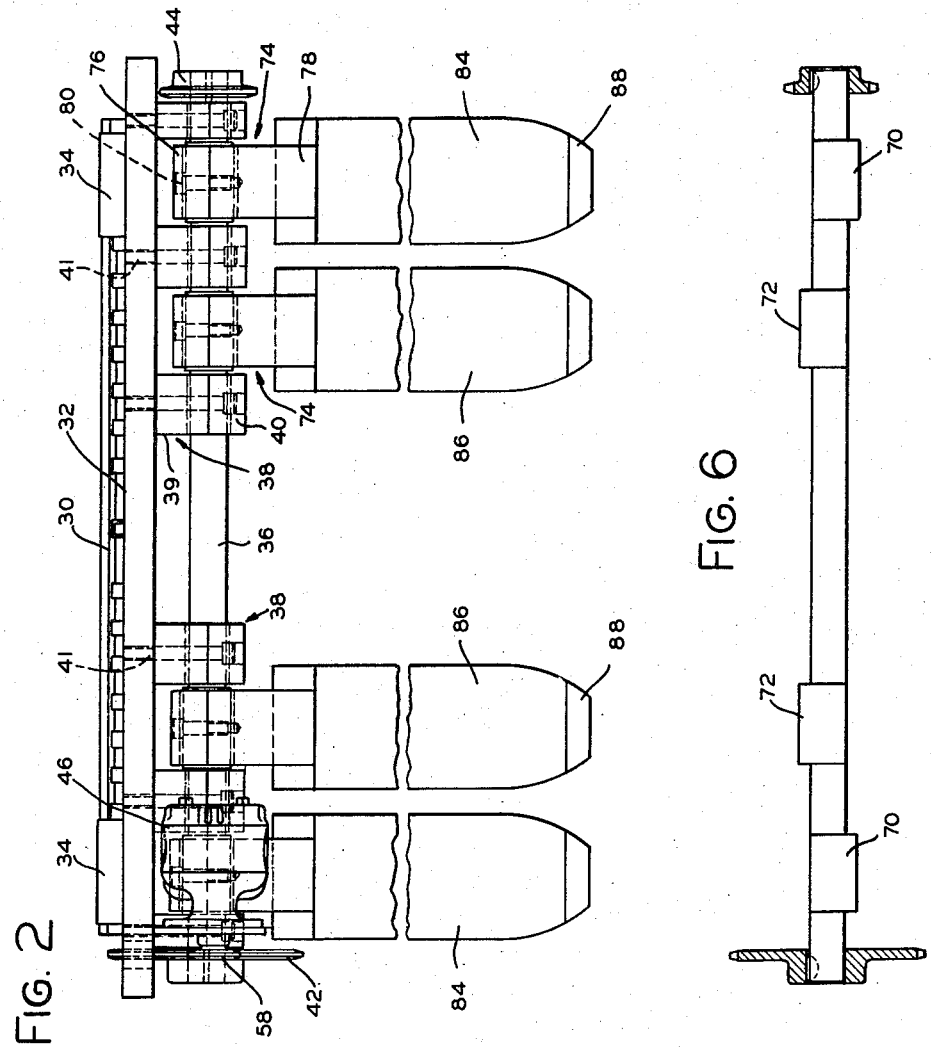
Figure 2 is an enlarged plan view of the attachment portion of the construction shown in Figure 1.

In carrying out our invention we have provided rotatable means having a plurality of camming means located in axially spaced relation thereon which are driveable in a rotary direction therewith by motor means, and load handling means mounted for rotation with said camming means, said camming means being so arranged on said shaft that rotation of the shaft results in out-of-phase rotation of the camming means.

Referring now to the drawings, the numeral 10 indicates generally an industrial lift truck provided with a body portion 12. The body portion houses a prime mover for the truck, such as an internal combustion engine, together with other devices and mechanisms as are usually provided in a vehicle of this kind. The vehicle is mounted on four wheels, including a pair of front wheels 14 and a pair of rear wheels 16. The front wheels 14 are the drive wheels whereas the rear wheels 16 are dirigible and are connected by a conventional steering linkage to an operator's steering wheel 18. The steering wheel 18 together with a seat 20 and the usual pedals and levers for operating the vehicle form the operator's station on the body of the vehicle.

At the forward end of the body portion of the machine is mounted a vertically disposed mast structure 22 which is pivoted at its lower end on the body portion of the vehicle. Suitable means such as hydraulic motors which are connected to the mast by means of fittings 24 are provided for tilting the mast forwardly and rearwardly under the control of the operator.

The mast structure illustrated is of the well known telescopic type, and includes an outer fixed upright guide portion formed by a pair of channels 26 (only one of which is shown) and an inner telescopic portion formed by a pair of channels, not shown, which are secured together in a suitable manner to form a unitary sliding structure. A load supporting carriage 30 is actuatable up and down within the mast structure by means of hydraulic hoist, chain and sprocket mechanism, not shown, of well known construction.

The attachment of our invention is removably secured to the carriage 30 by means of a fork bar 32 which is connected to the carriage 30 by means of brackets 34. A cam shaft 36 extends transversely of the truck 10 and is supported in a plane which is spaced a predetermined distance forwardly of fork bar 32 by means of a plurality of stationary bearing support members 38 which are spaced axially along cam shaft 36. Each of the members 38 comprises a main bearing member 39 and a cap 40 matable therewith to form a cylindrical bearing surface therebetween. Each member 38 is rigidly connected in a preselected location to fork bar 32 by means of a pair of bolts 41. A sprocket 42 is keyed to one end of the cam shaft 36 and a smaller sprocket 44 is keyed to the other end of said shaft.

An hydraulic motor means 46 is secured by means of an adapter plate 48 to a forwardly extending support plate 50 which is secured to an upwardly extending end 52 of the fork bar 32. Keyed to one end of a motor drive shaft 54, which extends through an opening in plate 50 and which is supported in a bearing 56, is a sprocket 58 which lies in the vertical plane of sprocket 42 and which is drivably connected thereto by means of a chain 60. The motor means 46 is of the reversible type and is adapted to be drivably connected to hydraulic pump means, not shown.

Operator control means of known construction, not shown, may be utilized for reversing the direction of flow through the motor means 46 as desired to effect a reversal of rotation of the motor means and of the sprockets 58 and 42. Rotation of sprocket 42 effects a rotation of cam shaft 36 and of sprocket 44, said latter sprocket being drivably connected to a sprocket 62, which is mounted at one end of a second cam shaft 64, by a chain 63. The cam shaft 64 extends transversely of the truck at a location adjacent the lower edge of fork bar 32 and in the vertical plane of cam shaft 36, said shaft 64 being supported by and rotatable in stationary support bearing members 66. On the opposite end of cam shaft 64 is mounted a cap 65 for substantially eliminating axial movement of the cam shaft. The bearing members 66 may be of the same construction as corresponding ones of bearing members 38, and are laterally spaced so as to be located in corresponding vertical planes of bearing members 38. It will now be readily seen that energization of motor means 46 will effect synchronized rotation of cam shafts 36 and 64 at a speed of rotation substantially less than the motor speed.

On each of the cam shafts 36 and 64 is formed a pair of outer and a pair of inner camming means 70 and 72, respectively, as best shown in Figure 6. The camming means 70 and 72 are located on the cam shaft 36 so as to lie intermediate bearing support blocks 38, and are similarly positioned on cam shaft 64 so as to lie intermediate bearing supports 66 and in vertical alignment with the camming means on shaft 36. Mounted on each camming means on each cam shaft is a bearing support block 74 consisting of a main bearing member 76 and an elongated cap member 78 which is secured to member 76 by means of a pair of vertically spaced bolts 80.

Each of the camming means 70 and 72 is cylindrical in shape and is mounted on one of the cam shafts such that it is eccentric to the axis of the respective cam shaft in equal amount as each other camming means. The portion of maximum rise of each camming means 70 is located 180° out of phase with the portion of maximum rise of each camming means 72. The cam shafts 36 and 64 are positioned in such angular relation that the members of each pair of vertically aligned camming means rotate in synchronous relation when the two cam shafts are driven in rotation. In other words, the maximum cam rise portion of one member of each such pair of camming means bears the same angular relation to the axis of its cam shaft as does the maximum cam rise portion of the other member.

Rigidly connected, as by welding, to the forwardly facing portions of each outer pair of vertically aligned bearing support blocks 74 is a vertically extending portion of a fork tine or load engaging means 84. Similarly connected to each inner pair of vertically aligned bearing means 74 is a fork tine 86. Each of the fork tines has chiseled ends 88 to facilitate the engaging of loads therewith.

It will now readily be seen that synchronized rotation of the cam shafts 36 and 64, as hereinbefore described, will impart a circular motion to fork tines 84 and 86 by means of camming means 70 and 72, respectively. As a result of the relative positions of camming means 70 and 72 on the cam shafts whereby each of camming means 70 rotates 180° out of phase with each of camming means 72, the pair of outer fork tines 84 will rotate in phase with each other and 180° out of phase with the pair of inner fork tines 86.

In Figure 7 we have shown the fork tines 84 and 86 in side elevation with the end portions thereof enlarged and in different relative positions through one complete cycle of rotation in order to illustrate the principle of operation of our invention. It will be noted that irrespective of the relative rotational positions of the forks, a projected line drawn to define the combined movements of the tips thereof will always define a diameter of a circle around the circumference of which the tip portions are actuated by means of the action of camming means 70 and 72.

It will be readily appreciated that the out-of-phase relationship between the inner and outer fork tines may be varied as desired by changing the relative angular positions of camming means 70 and 72 on the cam shafts, and that, further, the diameter of the curvilinear path which is generated by the fork tines may be varied as desired by varying the maximum rise of the camming means. It will also be apparent that our invention includes within its scope any number or variety of cam actuated fork tines which are rotatable in any phase relationship desired. For example, three pairs of fork tines could be mounted on cam shafts 36 and 64 and be actuated by camming means to operate in 120° out-of-phase relationship with respect to each other pair, if this were found desirable in practice. Any other combination of numbers of fork tines, of cam shape and size, and of phase relationship can obviously be supplied by any person skilled in the art without departing from the scope of our invention.

Now referring more in detail to Figure 7 and to the operation of our attachment, Figure 7A illustrates the relative positions of the pairs of fork tines 84 and 86 when said pairs are aligned horizontally and the tips of tines 86 are located ahead of the tips of tines 84. If the cam shafts are then rotated in a counterclockwise direction, as during loading of an object on the tines, the tips of the pairs of tines also rotate counterclockwise through the successive positions shown in Figures 7B, 7C, 7D and 7E; in Figure 7E the pairs of tines have returned to the original position illustrated in Figure 7A. Such out-of-phase rotary movement may be imparted to the fork tines after an operator has driven the truck 10 to a position in which the tips of the pairs of forks are immediately adjacent a load to be engaged. The forks rotate, as above described, at a controlled R. P. M., which enables the load to be "walked on" the pairs of tines until it is fully engaged thereby. The walking on movement of a load, such as a carton, is continuous and relatively rapid depending on the speed of rotation of the cam shafts. As the walking on action proceeds, it will be apparent that the load is engaged by all of the fork tines only when they are in horizontal alignment with each other, and at all other times one or the other pairs will be moving rearwardly or forwardly of the truck to actuate or to become ready to engage and actuate the load.

To deposit a load at any given selected location, an operator need only effect a reversal of rotation of motor means 46 and of the pairs of fork tines, which in turn effects a "walking off action" of the load relative to the fork tines, as the tines move in a clockwise direction as seen in Figure 7.

Figure 3:
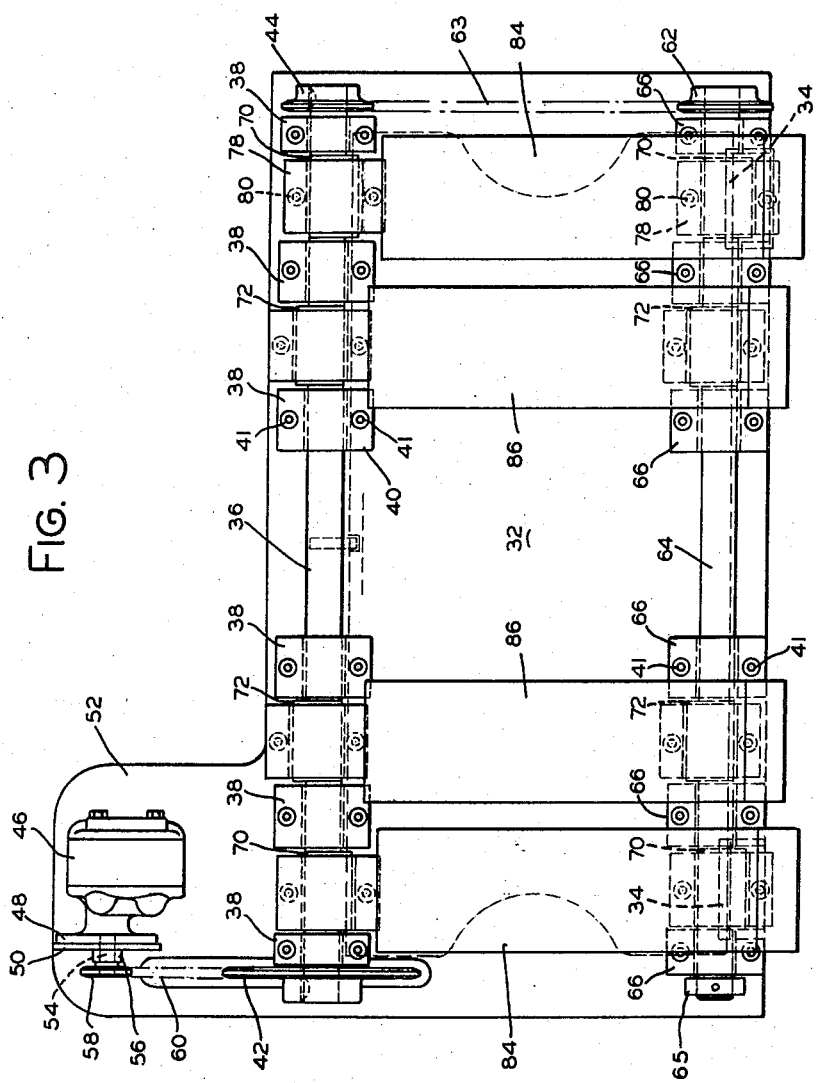
Figure 3 is a front elevational view of Figure 2.

Referring now to Figure 8, wherein we have shown another embodiment of our invention and wherein like parts are numbered as in Figures 3 and 4, there is illustrated a structure which would be particularly useful in handling, for example, flexible sacks of sugar, grain, or like material. In the embodiment of Figure 8 we have utilized a wide-faced platen 90 located intermediate a pair of outer wide-faced fork tines 84. The platen 90 is mounted on an elongated camming means 94 by means of a bearing support block 96 in the same manner as are the camming means 70 connected to fork tines 84 by bearing support blocks 74. The camming means 94 is preferably mounted on the cam shafts in 180° out-of-phase relation with respect to camming means 70, so that rotation of the cam shafts effects 180° out-of-phase rotation of platen 90 relative to fork tines 84.

From the above it will be seen that we have provided a relatively simple, inexpensive, and efficient means for loading and unloading a variety of types of unpalletized material.

Although only two embodiments of our invention have been illustrated and described, it will be apparent from the above that numerous changes in the form and relative arrangement of the parts may be made without departing from the scope of the invention.

We claim:

1. An attachment for use with industrial trucks comprising a pair of load engaging means such as fork tines, at least one additional load engaging means intermediate said pair thereof, in-phase eccentric means for mounting the load engaging members of said pair, eccentric means which is out of phase with said in-phase eccentric means for mounting said intermediate load engaging member, means connected to the truck for supporting both said eccentric means, and means for revolving together said in-phase and out-of-phase eccentric means, whereby the load engaging members of said pair are reciprocated in phase with each other in a curvilinear path and said intermediate load engaging member is reciprocated in a curvilinear path in out-of-phase relation to said pair of members.

2. An attachment as claimed in claim 1 wherein the intermediate load engaging means is actuatable in either direction in approximately 180° out-of-phase relation to the outer pair of load engaging means, whereby simultaneous actuation of all said load engaging means may effect either a walking-on or a walking-off of a load to be engaged or deposited, respectively.

3. An attachment for use with industrial trucks comprising mounting means extending transversely of the truck, shaft means extending longitudinally of said mounting means, means supporting said shaft means in spaced relation to said mounting means, first and second eccentric means mounted on and longitudinally spaced along said shaft means, a load engaging member connected to each of said first and second eccentric means, said first and second eccentric means being connected to said shaft means in out-of-phase relation with respect to each other, and motor means for rotatably actuating said shaft means together with said first and second eccentric means, whereby predetermined out-of-phase motion is imparted to both said load engaging means.

4. An attachment for use with industrial trucks comprising inner and outer pairs of fork tines, a rotatable shaft, inner and outer pairs of eccentrics mounted on said shaft, said inner pair of eccentrics being mounted on said shaft in out-of-phase relation to said outer pair of eccentrics, means mounting said outer pair of fork tines on said outer pair of eccentrics, means mounting said inner pair of fork tines on said inner pair of eccentrics, fork tine carrying means, means mounting said rotatable shaft in spaced relation to said carrying means, means mounting said carrying means on the truck, and reversible motor means operatively connected to said shaft for rotating same in either direction, whereby rotation of said shaft in one direction effects relative rotation in one direction between said outer pair of fork tines and said inner pair of fork tines and rotation of said shaft in the opposite direction effects opposite relative rotation between said outer and inner pairs of fork tines.

5. An attachment as claimed in claim 4 wherein said outer pair of fork tines rotates in approximately 180° out-of-phase relation to said inner pair of fork tines.

6. An attachment as claimed in claim 4 wherein a second shaft means is spaced vertically below said first shaft means and is similarly connected to said carrying means, and outer and inner pairs of eccentrics mounted on the second shaft means in like phase relation to the first mentioned outer and inner pairs of eccentrics, respectively, each one of said latter mentioned outer and inner pairs of eccentrics being spaced vertically beneath corresponding ones of said first mentioned outer and inner pairs of eccentrics, and means connecting adjacent portions of said outer and inner pairs of fork tines to respective ones of said latter mentioned outer and inner pairs of eccentrics.

7. An attachment as claimed in claim 6 wherein said first and second mentioned shaft means are drivably connected to rotate in synchronism.

8. An attachment for use with industrial trucks for handling non-palletized objects comprising mounting means, shaft means supported by said mounting means and located in spaced relation thereto, an outer pair of substantially circular eccentrics mounted on the shaft means for rotation about the shaft axis and located in axially spaced relation to each other, an eccentric mounted on said shaft means intermediate said pair of eccentrics and in out-of-phase relation thereto, said pair of eccentrics being mounted in in-phase relation on said shaft means, a pair of load engaging means mounted on said pair of eccentrics, a load engaging means mounted on said intermediate eccentric, means for rotating said shaft means, and means for mounting the attachment on the truck, said intermediate load engaging means being revolved in out-of-phase relation to in-phase revolution of the members of the outer pair of load engaging means for effecting a walking-on or walking-off movement of an unpalletized object relative to the truck.

9. An attachment for use with industrial trucks comprising first and second load engaging means adapted to extend forwardly of the truck, motor means, and means for connecting said first and second load engaging means and said motor means to the truck, said motor means being drivably connected to both said load engaging means for actuating each with respect to the other in such a manner that each of said load engaging means alternately traverses in out-of-phase relation an area above and below the load engaging surface of the other load engaging means whereby to effect substantially uninterrupted walking-on or walking-off movement of a load being engaged or disengaed, respectively.

References Cited in the file of this patent

UNITED STATES PATENTS

| | | |
|---|---|---|
| 1,486,984 | McKee | Mar. 18, 1924 |
| 2,289,022 | Maurer | July 7, 1942 |
| 2,628,734 | Jannsen | Feb. 17, 1953 |
| 2,629,504 | Peterson | Feb. 24, 1953 |